US010508054B2

(12) United States Patent
Brudieu et al.

(10) Patent No.: US 10,508,054 B2
(45) Date of Patent: Dec. 17, 2019

(54) TRANSPORT VEHICLE GLAZING WITH WATER REPELLENT AND ANTI-DUST COATING ASSOCIATED WITH A DETECTION DEVICE

(71) Applicant: SAINT-GOBAIN GLASS FRANCE, Courbevoie (FR)

(72) Inventors: Barbara Brudieu, Paris (FR); François Guillemot, Paris (FR); Jérémie Teisseire, Antony (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 57 days.

(21) Appl. No.: 15/757,606

(22) PCT Filed: Sep. 6, 2016

(86) PCT No.: PCT/FR2016/052208
§ 371 (c)(1),
(2) Date: Mar. 5, 2018

(87) PCT Pub. No.: WO2017/042469
PCT Pub. Date: Mar. 16, 2017

(65) Prior Publication Data
US 2019/0023608 A1 Jan. 24, 2019

(30) Foreign Application Priority Data
Sep. 7, 2015 (FR) ...................... 15 58264

(51) Int. Cl.
C03C 17/00 (2006.01)
C03C 17/42 (2006.01)
B60J 1/00 (2006.01)
B60J 1/02 (2006.01)
B60J 1/20 (2006.01)

(52) U.S. Cl.
CPC ............. *C03C 17/009* (2013.01); *B60J 1/002* (2013.01); *B60J 1/02* (2013.01); *B60J 1/2094* (2013.01); *C03C 17/42* (2013.01); *C03C 2217/425* (2013.01); *C03C 2217/445* (2013.01); *C03C 2217/45* (2013.01); *C03C 2217/47* (2013.01); *C03C 2217/76* (2013.01); *C03C 2217/91* (2013.01); *C03C 2218/111* (2013.01); *C03C 2218/112* (2013.01); *C03C 2218/118* (2013.01); *C03C 2218/119* (2013.01)

(58) Field of Classification Search
CPC . C03C 17/009; C03C 17/42; C03C 2217/425; C03C 2217/76
See application file for complete search history.

(56) References Cited

U.S. PATENT DOCUMENTS

| 5,415,927 A | 5/1995 | Hirayama et al. |
| 2010/0101649 A1* | 4/2010 | Huignard .......... B32B 17/10036 136/261 |
| 2015/0210951 A1* | 7/2015 | Aizenberg .............. B08B 17/06 508/107 |
| 2017/0058130 A1* | 3/2017 | Addleman ............... C09D 5/00 |

FOREIGN PATENT DOCUMENTS

WO  WO 2009/118552 A1  10/2009

OTHER PUBLICATIONS

International Search Report as issued in International Patent Application No. PCT/FR2016/052208, dated Nov. 29, 2016.
International Preliminary Report on Patentability and the Written Opinion of the International Searching Authority as issued in International Patent Application No. PCT/FR2016/052208, dated Mar. 13, 2018.

* cited by examiner

Primary Examiner — Hai Vo
(74) Attorney, Agent, or Firm — Pillsbury Withrop Shaw Pittman LLP

(57) ABSTRACT

A vehicle glazing includes on its surface to be exposed to the exterior atmosphere, at least in a zone not wiped by the windscreen wipers, a mineral oxide layer of 0.1 to 20 μm thickness, 30 to 90% of the volume of which consists of 20 to 300 nm open pores that are distributed uniformly throughout the thickness of the layer, and almost all of which are connected to one another, the internal and external surface of the layer being functionalized with a compound containing a perfluoroalkyl or alkyl functional group, then saturated with a hydrophobic oil that impregnates the functionalized porous layer and forms a film on the surface thereof, the at least one zone being located facing a detecting device such as an anti-collision/obstacle-detecting/security video camera, or similar, placed in the interior of the vehicle, in particular on the face of the glazing.

18 Claims, No Drawings

TRANSPORT VEHICLE GLAZING WITH WATER REPELLENT AND ANTI-DUST COATING ASSOCIATED WITH A DETECTION DEVICE

CROSS-REFERENCE TO RELATED APPLICATIONS

This application is the U.S. National Stage of PCT/FR2016/052208, filed Sep. 6, 2016, which in turn claims priority to French patent application number 1558264 filed Sep. 7, 2015. The content of these applications are incorporated herein by reference in their entireties.

The invention relates to a transport vehicle glazing through which a detecting device such as an anti-collision/obstacle-detecting/security video camera or similar is operated, said device being placed in the interior of the vehicle and in particular on the face of the glazing.

The inventors have sought a way of guaranteeing maximum and durable cleanliness of that face of the glazing which is intended to be exposed to the exterior atmosphere, in its zone located facing the detecting device. They have carried out research into functional systems having water-repellent properties (low hysteresis, i.e. little difference between the advancing angle and receding angle of a water droplet on an inclined substrate, and high contact angle) by virtue of a perfectly planar hydrophobic coating. Thus, the target was to obtain a glazing of high and durable transparency having an exterior surface from which liquids such as water run-off, this implying dust-resistance and anti-fog properties.

This aim is achieved by the invention, one subject of which is a transport vehicle glazing comprising, on its surface intended to be exposed to the exterior atmosphere, at least in a zone not wiped by the windscreen wipers, a mineral oxide layer of 0.1 to 20 µm thickness, 30 to 90% of the volume of which consists of 20 to 300 nm open pores that are distributed uniformly throughout the thickness of the layer, and almost all of which are connected to one another, the internal and external surface of the layer being functionalized with a compound containing a perfluoroalkyl or alkyl functional group, then saturated with a hydrophobic oil that impregnates the functionalized porous layer and forms a film on the surface thereof, said at least one zone being located facing a detecting device such as an anti-collision/obstacle-detecting/security video camera, or similar, placed in the interior of the vehicle, in particular on the face of the glazing.

By "internal surface" of the layer, what is meant here is the surface of the pores.

The hydrophobic oil comprises a fluorinated oil or a non-fluorinated silicone. It impregnates the porous silica layer and forms a film on the surface thereof by virtue of the affinity (noncovalent bonds) with the compound containing a perfluoroalkyl or alkyl functional group, i.e. the compound grafted to the surface of the pores (this graft modifies the (internal and external) surface tension of the mineral oxide layer). This leads to a planar hydrophobic layer of liquid and/or semi-liquid semi-solid nature. The porous layer makes it possible to obtain a durable maintenance of the hydrophobic oil by virtue of its impregnation into the porous layer (a hydrophobic oil on glass is not as effective in terms of repellency).

Unexpectedly, the complex coating of the glazing of the invention is durable and compatible with the demanding conditions of use of a motor vehicle windshield, for example, ensuring the perennity of the optimal operation of an obstacle-detecting video camera or similar.

The external surface of the glazing has excellent water-repellency and anti-fog properties, and the run-off of the water removes dust.

The complex coating according to the invention may be produced over large areas, and its parameters such as fraction of pores per unit volume, adhesion, etc. are easily controllable.

According to other preferred features of the glazing of the invention:
the layer is made of silica; since the porous layer is smooth and made from silica, its refractive index is low (about 1.15 to 1.30 at a wavelength of 600 nm) this allowing a system that is transparent on glass (no diffraction or scattering of light) to be obtained;
at least 40 and preferably 50% of the volume of the layer consists of pores;
at most 80% of the volume of the layer consists of pores;
the pores are at least 30, preferably 40 and particularly preferably 50 nm in size;
the pores are at most 200 nm in size;
the hydrophobic oil is chosen from one of or a blend of two or more of the following: perfluorinated hydrocarbons or organic silicones, elastomers for example; perfluoropolyethers, perfluoroalkylethers and perfluorocycloethers; tertiary perfluoroalkylamines; perfluoroalkylsulfides and perfluoroalkylsulfoxides; perfluoroalkylphosphines and their oxidation products; perfluorinated carboxylic acids; fluorinated phosphonic and sulfonic acids; and fluorinated silanes;

Another subject of the invention is a process for manufacturing a glazing such as described above, characterized in that it comprises the operations consisting in succession in:
depositing on a glazing substrate a liquid pore-forming agent composition and mineral oxide precursor(s);
calcinating the obtained assembly so as to remove the pore-forming agent and form a condensed porous layer on the substrate;
grafting onto the external and internal surface of the porous layer a compound containing a perfluoroalkyl or alkyl functional group, then
pouring an excess of hydrophobic oil onto the substrate, the substrate being held inclined in order to remove excess oil from the substrate.

According to preferred features of this process:
the mineral oxide is silica, and the silica precursors conjointly implemented are glycidoxypropyltrimethoxysilane (GLYMO) and tetraethoxysilane (TEOS); the use of GLYMO as precursor allows relatively thick (thicknesses larger than 1.5 µm) crack-free layers with a relatively high pore volume (higher than 50%) to be obtained;
the pore-forming agent is chosen from a latex of acrylic particles, such as particles of polymethyl methacrylate (PMMA), or a meth(acrylic) polymer emulsion;
the liquid pore-forming agent composition and mineral oxide precursor(s) are deposited on the substrate by roller, spraying, dip-coating, screen printing (with adjustment of the rheology) or another type of printing, inkjet printing for example.
the compound containing a perfluoroalkyl functional group has the general formula:

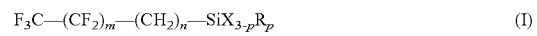

$$F_3C-(CF_2)_m-(CH_2)_n-SiX_{3-p}R_p \qquad (I)$$

in which
m=0 to 15, preferably 5 to 11 and particularly preferably at most 9;
n=1 to 5 and preferably n=2;
p=0, 1 or 2, preferably 0 or 1 and particularly preferably 0;
R is an alkyl group or a hydrogen atom; and
X represents a hydrolysable group such as a hydroxy or alkoxy group and in particular an ethoxy, methoxy or halide group;
or consists of a perfluoropolyethersilane of the type represented by the general formula

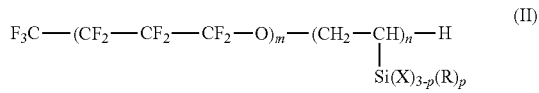  (II)

or by the general formula

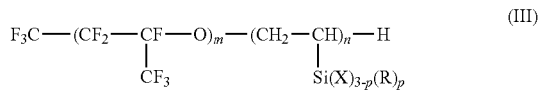  (III)

in which:
m=2 to 30;
n=1 to 3 and preferably n=1;
p=0, 1 or 2, preferably 0 or 1 and particularly preferably 0;
R is an alkyl group or a hydrogen atom; and
X is a hydrolysable group such as a hydroxy or alkoxy group and in particular an ethoxy, methoxy or halide group;
or indeed consists of a perfluoropolyether bearing an alkoxysilane group at two ends, in particular such as that sold under the registered trademark Fluorolink® by Solvay, which is described in U.S. Pub. No. 2011/0250422 and has the following formula:

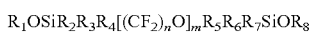

wherein $R_1O$ and $OR_8$ are alkoxy groups,
$R_{2-7}$ are alkyl groups optionally comprising one or more heteroatoms, such as O, N, S, F, P, and
n and m being integers of 1 or more;
before the compound containing a perfluoroalkyl or alkyl functional group is grafted, the internal and external surface of the porous layer is hydrophilic, and the graft precursor containing a perfluoroalkyl or alkyl functional group is hydrolyzed so as to condense with the surface of the layer to obtain the graft.

Another subject of the invention consists of the application of a glazing unit such as described above to a windshield of a ground transport vehicle, in particular an automobile, or to a windshield of a rail, air or water transport vehicle.

The invention will be better understood in light of the following exemplary embodiment.

EXAMPLE

A glycidoxypropyltrimethoxysilane (GLYMO) solution is prepared by mixing 10 g of GLYMO and 2.25 g of pH=2 HCl solution under agitation at room temperature for about 2 h.

A tetraethoxysilane (TEOS) solution is prepared by mixing 4 g of TEOS and 6 g of pH=2 HCl solution under agitation at room temperature for about 2 h.

A GLYMOS-TEOS sol is prepared by mixing 1 part of GLYMO sol to 2 parts of TEOS sol (by weight).

The solution to be deposited is prepared by mixing 0.98 g of the GLYMO-TEOS sol prepared above, 0.59 g of the methacrylic polymer emulsion sold under the registered trademark NeoCryl® XK-52 by DSM, 3.4 g of pH=2 HCl solution, and 0.5% by weight of the fluorinated surfactant sold under the registered trademark Novec® FC-4430 by 3M.

This solution is deposited by roller on a sample of soda-lime-silica float glass of 10 cm×10 cm area and 4 mm thickness.

The sample is calcinated at 450° C. with the aim of degrading the pore-forming agent (NeoCryl® XK-52). A crack- and splinter-free condensed porous silica layer of 1.7 μm thickness and 60% porosity is obtained with pores of 60 nm size, the pores almost all being connected to one another throughout the thickness of the coating.

A mixture of 213 μL of 1H,1H,2H,2H-perfluorodecyltriethoxysilane (designated SiF7 below) respecting the formula $F_3C—(CF_2)_7—(CH_2)_2—Si(OC_2H_5)_3$, of 9 g of isopropanol (IPA) and of 1 g of 0.1N HCl is then prepared. This mixture has a pH=1. SiF7 is hydrolyzed therein, i.e. each of the three ethoxy groups is replaced by a hydroxy group OH therein.

The surface of the condensed porous silica layer prepared above is made hydrophilic with a 60-minute UV-ozone treatment at 50° C., then the hydrolyzed SiF7 mixture prepared above is wiped (i.e. deposited by means of an imbibed cloth) onto the surface of the hydrophilic porous layer in order to condense the Si—OH groups of the SiF7 with those of the porous layer by forming Si—O—Si bonds. Instead of wiping, the hydrolyzed SiF7 mixture may also be deposited by spraying.

The sample is then baked at 150° C. for 30 to 60 minutes.

Onto the porous layer thus functionalized by SiF7, an excess of perfluoropolyether oil respecting the following formula is poured:

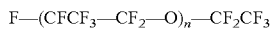

with n comprised between 10 and 60,
viscosity of 12.6 cP,
this oil being that sold by Du Pont under the registered trademark Krytox GL 100 ®. The sample is held inclined in order to remove excess oil from the substrate. The amount of oil retained thereby is at least equal to 0.5 ml/cm².

A droplet of water on the surface of the coating consisting of the porous layer+SiF7+Krytox® does not spread and runs off even when the sample is held flat. The coating is hydrophobic and the water-immiscible fluorinated liquid prevents any adhesion of the droplet via capillary action. A small inclination (5°) is enough to make the droplet run off the sample, leaving no trace.

The repellent coating is durable in two respects:
The fluorinated oil remains durably impregnated in the porous layer even though it is fluid and is doubtlessly removed in small amounts by water droplets running over the surface. A 200 mm volume of water applied in drops to a given point of the surface of the sample does not diminish the repellency properties.
Cleaning of the coating or a very-long-term use implies gradual removal of the oil. Nevertheless, the latter may be easily reapplied to the surface of the sample (coated with the porous layer functionalized with the remaining oil) in order to allow it to recover a performance equivalent to when first used.

Moreover, this repellency property gives the coating dust-resistance and anti-frost functionalities.

This repellent coating with its macroporous layer is very advantageous for glazings in which transparency is required and in which mark-resistance, dust-resistance and/or anti-frost functionalities are desired. It is particularly advantageous, in the context of the invention, to coat that zone of the windshield of automobiles behind which the obstacle-detecting video camera (more and more commonly used by automobile manufacturers) or equivalent is located.

The invention claimed is:

1. A transport vehicle glazing comprising a first side to face an interior of a transport vehicle and a second side to face an exterior atmosphere, the second side being opposite the first side, at least one zone of the second side not wiped by windscreen wipers and facing the exterior atmosphere, and said at least one zone being located to face a detecting device placed in the interior of the transport vehicle, wherein the transport vehicle glazing comprises a substrate and a mineral oxide layer provided on the substrate, the mineral oxide layer being of 0.1 to 20 μm thickness, wherein 30% to 90% of the volume of the mineral oxide layer consists of 20 to 300 nm open pores that are distributed uniformly throughout the thickness of the mineral oxide layer, and a majority of the open pores are connected to one another, an internal surface and an external surface of the mineral oxide layer being functionalized with a compound containing a perfluoroalkyl or alkyl functional group, saturated with a hydrophobic oil that impregnates the functionalized porous layer and forms a film on the surface thereof, and wherein the mineral oxide layer is made of silica and formed at least in the zone of the second side not wiped by windscreen wipers and facing the exterior atmosphere.

2. The glazing as claimed in claim 1, wherein 40% to 90% of the volume of the mineral oxide layer consists of open pores.

3. The glazing as claimed in claim 2, wherein from 50% to 90% of the volume of the mineral oxide layer consists of open pores.

4. The glazing as claimed in claim 1, wherein 30% to 80% of the volume of the layer consists of open pores.

5. The glazing as claimed in claim 1, wherein the open pores are from 30 nm to 300 nm in size.

6. The glazing as claimed in claim 5, wherein the open pores are from 50 nm to 300 nm in size.

7. The glazing as claimed in claim 1, wherein the open pores are from 20 nm to 200 nm in size.

8. The glazing as claimed in claim 1, wherein the hydrophobic oil comprises at least one compound selected from the group consisting perfluorinated hydrocarbons or organic silicones; perfluoropolyethers, perfluoroalkylethers and perfluorocycloethers; tertiary perfluoroalkylamines; perfluoroalkylsulfides and perfluoroalkylsulfoxides; perfluoroalkylphosphines and oxidation products thereof; perfluorinated carboxylic acids; fluorinated phosphonic and sulfonic acids; fluorinated silanes; and any combinations thereof.

9. The glazing as claimed in claim 1, wherein the detecting device is an anti-collision/obstacle-detecting/security video camera.

10. The glazing as claimed in claim 1, wherein the detecting device is placed on the first side of the glazing.

11. A process for manufacturing a transport vehicle glazing that comprises a first side to face an interior of a transport vehicle and a second side to face an exterior atmosphere, the second side being opposite the first side, the process comprising in succession:

depositing on a substrate a liquid pore-forming agent composition and one or more mineral oxide precursors;
calcinating the obtained assembly of the substrate coated with the liquid pore-forming agent composition and the one or more mineral oxide precursors to remove the pore-forming agent and form a condensed porous mineral oxide layer of 0.1 to 20 μm thickness on the substrate, wherein 30 to 90% of the volume of the mineral oxide layer consists of 20 to 300 nm open pores that are distributed uniformly throughout the thickness of the mineral oxide layer, and a majority of the open pores are connected to one another;

grafting onto an external surface and an internal surface of the porous mineral oxide layer said compound containing a perfluoroalkyl or alkyl functional group to functionalize the internal and the external surfaces of the porous mineral oxide layer, then pouring an excess of hydrophobic oil onto the functionalized mineral oxide layer of the substrate, the hydrophobic oil impregnating the functionalized mineral oxide layer and forming a film on the surface thereof, the substrate being held inclined in order to remove excess oil from the substrate, wherein the mineral oxide layer is made of silica and formed at least in a zone of the second side not wiped by windscreen wipers and facing the exterior atmosphere, and said at least one zone being located to face a detecting device placed in the interior of the transport vehicle.

12. The process as claimed in claim 11, wherein the mineral oxide is formed from silica precursors comprising glycidoxypropyltrimethoxysilane and tetraethoxysilane.

13. The process as claimed in claim 11, wherein the pore-forming agent is selected from the group consisting of a latex of acrylic particles and a meth(acrylic) polymer emulsion.

14. The process as claimed in claim 13, wherein the pore-forming agent is formed from a latex of particles of polymethyl methacrylate.

15. The process as claimed in claim 11, wherein the liquid pore-forming agent composition and the one or more mineral oxide precursors are deposited on the substrate by roller, spraying, dip-coating, screen printing with adjustment of the rheology or inkjet printing.

16. The process as claimed in claim 11, wherein the compound containing a perfluoroalyl functional group has the formula:

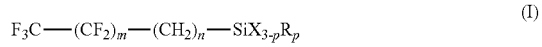

in which
m=0 to 15;
n=1 to 5;
p=0, 1 or 2;
R is an alkyl group or a hydrogen atom; and
X represents a hydrolysable group;
or consists of a perfluoropolyethersilane represented by the formula (II)

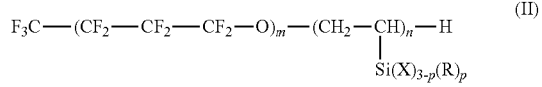

or by the formula

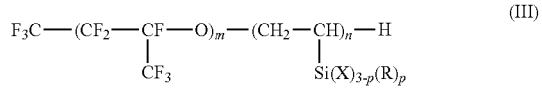

in which:
m=2 to 30;
n=1 to 3;
p=0, 1 or 2;
R is an alkyl group or a hydrogen atom; and
X is a hydrolysable group;
or consists of a perfluoropolyether bearing an alkoxysilane group at two ends having the following formula $$R_1OSiR_2R_3R_4[(CF_2)_nO]R_5R_6R_7SiOR_8$$

wherein $R_1O$ and $OR_8$ are alkoxy groups,
$R_{2-7}$ are alkyl groups optionally comprising one or more heteroatoms,
n and m being integers of 1 or more.

17. The process as claimed in claim 16, wherein, in formula I, m=5 to 11.

18. The process as claimed in claim 11, wherein, before the compound containing a perfluoroalkyl or alkyl functional group is grafted, the internal and external surfaces of the porous mineral oxide layer are hydrophilic, and wherein a graft precursor containing a perfluoroalkyl or alkyl functional group is hydrolyzed to condense with the surface of the porous mineral oxide layer to obtain the graft.

\* \* \* \* \*